(12) United States Patent
Luo et al.

(10) Patent No.: US 10,063,314 B2
(45) Date of Patent: Aug. 28, 2018

(54) OPTICAL TIME DOMAIN REFLECTOMETER AND METHOD FOR DETECTING OPTICAL FIBER BY USING THE SAME

(71) Applicant: Huawei Technologies Co., Ltd., Shenzhen (CN)

(72) Inventors: Xiaodong Luo, Chengdu (CN); Yansui Huang, Shenzhen (CN); Ning Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/449,133

(22) Filed: Mar. 3, 2017

(65) Prior Publication Data
US 2017/0180042 A1 Jun. 22, 2017

Related U.S. Application Data

(63) Continuation of application No. PCT/CN2014/086080, filed on Sep. 5, 2014.

(51) Int. Cl.
*H04B 10/071* (2013.01)
*H04J 14/02* (2006.01)

(52) U.S. Cl.
CPC ............ *H04B 10/071* (2013.01); *H04J 14/02* (2013.01)

(58) Field of Classification Search
CPC .......... H04B 10/5057; H04B 10/50572; H04B 10/50575; H04B 10/50577; H04B 10/07; H04J 14/02

See application file for complete search history.

(56) References Cited

U.S. PATENT DOCUMENTS 6,708,004 B1 3/2004 Homsey
8,588,609 B2 * 11/2013 Hiraizumi ........ H04B 10/07953
398/26

(Continued)

FOREIGN PATENT DOCUMENTS

CN 101917226 A 12/2010
CN 102158280 A 8/2011

(Continued)

OTHER PUBLICATIONS

Shim, H.K. et al., "Demonstration of Correlation-Based OTDR for In-Service Monitoring of 64-Split TDM PON", Optical Society of America, OFC/NFOEC Technical Digest, dated Mar. 4, 2012, 3 pages.

*Primary Examiner* — Shi K Li
*Assistant Examiner* — Mina Shalaby
(74) *Attorney, Agent, or Firm* — Slater Matsil, LLP (57) ABSTRACT

An optical time domain reflectometer and a method for detecting an optical fiber are disclosed. In an embodiment the optical time domain reflectometer includes: a service signal generator, a signal coupler connected to the service signal generator, an electro-optical modulator connected to the signal coupler, a transmitter connected to the electro-optical modulator, a photoelectric detector connected to the transmitter, and an analog to digital converter connected to the photoelectric detector. The optical time domain reflectometer further includes: a digital signal processor, connected to the service signal generator, the signal coupler, and the analog to digital converter, and configured to generate compensation data and a PN code sequence, receive a sampled signal sent by the analog to digital converter, and calculate a first optical fiber function.

13 Claims, 6 Drawing Sheets

(56) References Cited

U.S. PATENT DOCUMENTS

| | | | |
|---|---|---|---|
| 8,606,117 B1* | 12/2013 | Turner | G01M 11/3118 |
| | | | 298/13 |
| 2008/0077343 A1 | 3/2008 | Johansson | |
| 2010/0320370 A1* | 12/2010 | Nagarajan | G02B 6/12004 |
| | | | 250/227.24 |
| 2012/0288284 A1* | 11/2012 | Yoshida | H04B 10/5053 |
| | | | 398/186 |
| 2013/0202287 A1 | 8/2013 | Joffe | |
| 2015/0236790 A1* | 8/2015 | Guo | H04B 10/5053 |
| | | | 398/25 |
| 2017/0353238 A1* | 12/2017 | Huang | H04B 10/071 |

FOREIGN PATENT DOCUMENTS

| | | | |
|---|---|---|---|
| CN | 102725976 A | 10/2012 | |
| CN | 102761363 A | 10/2012 | |
| CN | 103326775 A | 9/2013 | |
| CN | 203719675 U | 7/2014 | |

* cited by examiner

OPTICAL TIME DOMAIN REFLECTOMETER AND METHOD FOR DETECTING OPTICAL FIBER BY USING THE SAME

CROSS-REFERENCE TO RELATED APPLICATIONS

This application is a continuation of International Application No. PCT/CN2014/086080, filed on Sep. 5, 2014, the disclosure of which is hereby incorporated by reference in its entirety.

TECHNICAL FIELD

The present invention relates to the field of optical communications, and in particular, to an optical time domain reflectometer and a method for detecting an optical fiber by using the same.

BACKGROUND

With rapid development of optical communication technologies, WDM (Wavelength Division Multiplexing) network is increasingly widely applied. The WDM is a technology for sending multiple beams of laser light with different wavelengths on a single optical fiber by using multiple lasers. To ensure quality of service data in an optical communication process, an OTDR (Optical Time Domain Reflectometer) needs to be used to detect a loss of a physical link in the WDM network. The OTDR is a precise photoelectric integrated instrument that is produced according to back scattering generated during transmission of an optical signal in an optical fiber, is widely applied to maintenance and construction of optical cable lines, and can be used to perform measurement on an optical fiber length, optical fiber transmission attenuation, and splice attenuation, measurement for fault locating, and the like.

A basic principle of measuring optical fiber transmission attenuation by using a conventional OTDR is: a transmit end of the OTDR sends a single pulse; after electro-optical modulation is performed on the single pulse, the single pulse enters an optical fiber, and Rayleigh scattering and Fresnel reflection are performed on the single pulse; a receive end of the OTDR receives an optical signal emitted from the optical fiber, so that a loss of an optical fiber link is obtained. However, because a power of the sent signal pulse is relatively high, to avoid impact on normal detection of a service signal, the signal pulse cannot be transmitted together with the service signal. Consequently, the loss of the optical fiber link cannot be detected in real time. A basic principle of measuring optical fiber transmission attenuation by using a multipulse OTDR is: a transmit end of the OTDR sends a PN (Pseudo-Noise) code sequence, and combines the PN code sequence and a service signal together for transmission by means of modulation, so that real-time detection on an optical fiber link is implemented. Further, to reduce impact of the service signal on PN code sequence correlation, the OTDR further can modulate the PN code sequence and the service signal to different bands, and distinguish different frequency components by using a filter at a receive end, so as to reduce mutual impact between service data and the PN code sequence.

However, the service signal and the PN code sequence are both baseband signals and can affect each other in a low frequency part. Consequently, the PN code sequence correlation is damaged, performance of the OTDR is seriously affected, and a relatively large detection error is caused. Therefore, the service signal needs to be modulated to a high frequency and be distinguished from the PN code sequence in a frequency domain, in this case, a transmission rate of the service signal is increased, and related hardware needs to satisfy an increased rate of the service signal, causing unnecessary hardware costs and a bandwidth waste.

SUMMARY

Embodiments of the present invention provide an optical time domain reflectometer and a method for detecting an optical fiber by using the same. Compensation data, a service signal, and a PN code sequence may be obtained and real-time compensation may be performed for a sampled signal of the optical time domain reflectometer by using the compensation data, so that impact of the service signal on PN code sequence correlation can be reduced without additional hardware costs or additional data service bandwidths, so as to obtain a more precise attenuation curve of the optical fiber and improve detection precision of the optical time domain reflectometer.

According to a first aspect, an embodiment of the present invention provides an optical time domain reflectometer, including a service signal generator, a signal coupler connected to the service signal generator, an electro-optical modulator connected to the signal coupler, a transmitter connected to the electro-optical modulator, a photoelectric detector connected to the transmitter, and an analog to digital converter connected to the photoelectric detector, where the optical time domain reflectometer further includes a digital signal processor, connected to the service signal generator, the signal coupler, and the analog to digital converter, and configured to: receive a service signal generated by the service signal generator; generate compensation data and a PN code sequence, send the PN code sequence to the signal coupler, receive a sampled signal sent by the analog to digital converter, and calculate a first optical fiber function according to the compensation data, the PN code sequence, and the sampled signal, where the compensation data is used to reduce interference from the service signal to the PN code sequence, and the sampled signal is a signal that is sent by the analog to digital converter after the analog to digital converter performs sampling on a service signal that is modulated with the PN code sequence and that is reflected an optical fiber.

According to the first aspect, in a first possible implementation manner, the digital signal processor is specifically configured to: generate the PN code sequence and send the PN code sequence to the signal coupler; receive the sampled signal sent by the analog to digital converter; read a second optical fiber function; receive the service signal generated by the service signal generator, and generate a compensation sequence according to the service signal; perform an operation on the compensation sequence, the second optical fiber function, and the PN code sequence, to generate the compensation data; and calculate the first optical fiber function according to the compensation data, the PN code sequence, and the sampled signal, where the second optical fiber function is an optical fiber function stored in the digital signal processor, and a sum of the compensation sequence and the service signal is a non-zero constant.

According to the first aspect or the first possible implementation manner, in a second possible implementation manner, the digital signal processor specifically includes: (1) a PN code sequence generator, connected to the signal coupler, and configured to generate the PN code sequence, and send the PN code sequence to the signal coupler, a compensation data generator, and a calculator; (2) a signal memory, connected to the analog to digital converter, and configured to receive and store the sampled signal sent by the analog to digital converter, and send the sampled signal to a summator; (3) the compensation data generator, connected to the service signal generator and the PN code sequence generator, and configured to: receive the service signal sent by the service signal generator, the PN code sequence sent by the PN code sequence generator, and the second optical fiber function sent by an optical fiber function memory, where the second optical fiber function is an optical fiber function stored in the optical fiber function memory; generate the compensation data according to the service signal, the PN code sequence, and the second optical fiber function; and send the compensation data to the summator; (4) the summator, connected to the signal memory and the compensation data generator, and configured to perform an addition operation on the compensation data and the sampled signal, and send an operation result to the calculator; (5) the calculator, connected to the summator and the PN code sequence generator, and configured to: receive the PN code sequence sent by the PN code sequence generator and the operation result that is obtained and sent by the summator after the summator performs the addition operation on the compensation data and the sampled signal, calculate the first optical fiber function according to the PN code sequence and the operation result that is obtained after the summator performs the addition operation on the compensation data and the sampled signal, and send the first optical fiber function to the optical fiber function memory, so that the optical fiber function memory replaces the second optical fiber function with the first optical fiber function; and (6) the optical fiber function memory, connected to the calculator and the compensation data generator, and configured to store the second optical fiber function and the first optical fiber function that is sent by the calculator, and send the second optical fiber function to the compensation data generator.

According to the second possible implementation manner, in a third possible implementation manner, the compensation data generator specifically includes: (1) a compensation sequence generator, connected to the service signal generator, and configured to receive the service signal sent by the service signal generator, generate the compensation sequence according to the service signal, and send the compensation sequence to a compensation data operator; and (2) the compensation data operator, connected to the compensation sequence generator and the PN code sequence generator, and configured to: receive the compensation sequence sent by the compensation sequence generator, the PN code sequence sent by the PN code sequence generator, and the second optical fiber function sent by the optical fiber function memory, perform an operation on the compensation sequence, the PN code sequence, and the second optical fiber function, to generate the compensation data, and send the compensation data to the summator.

According to the second possible implementation manner or the third possible implementation manner, in a fourth possible implementation manner, the compensation data operator specifically includes: (1) a compensation data multiplier, connected to the compensation sequence generator and the PN code sequence generator, and configured to receive the compensation sequence sent by the compensation sequence generator and the PN code sequence sent by the PN code sequence generator, perform a multiplication operation on the compensation sequence and the PN code sequence, and send an operation result to a compensation data convolver; and (2) the compensation data convolver, connected to the compensation data multiplier, the summator, and the optical fiber function memory, and configured to: receive the second optical fiber function sent by the optical fiber function memory and the operation result that is obtained and sent by the compensation data multiplier after the compensation data multiplier performs the multiplication operation on the compensation sequence and the PN code sequence, perform a convolution operation on the second optical fiber function and the operation result that is obtained after the compensation data multiplier performs the multiplication operation on the compensation sequence and the PN code sequence, to obtain the compensation data, and send the compensation data to the summator.

According to the second possible implementation manner or the third possible implementation manner, in a fifth possible implementation manner, the compensation data operator specifically includes: (1) a compensation data summator, connected to the compensation sequence generator and the PN code sequence generator, and configured to: receive the compensation sequence sent by the compensation sequence generator and the PN code sequence sent by the PN code sequence generator, perform an addition operation on the compensation sequence and the PN code sequence, and send an operation result to a compensation data convolver; and (2) the compensation data convolver, connected to the compensation data summator, the summator, and the optical fiber function memory, and configured to: receive the second optical fiber function sent by the optical fiber function memory and the operation result that is obtained and sent by the compensation data summator after the compensation data summator performs the addition operation on the compensation sequence and the PN code sequence, perform a convolution operation on the second optical fiber function and the operation result that is obtained after the compensation data summator performs the addition operation on the compensation sequence and the PN code sequence, to obtain the compensation data, and send the compensation data to the summator.

According to the first aspect, in a sixth possible implementation manner, the transmitter is specifically a circulator or a coupler.

According to a second aspect, an embodiment of the present invention provides a method for detecting an optical fiber by using an optical time domain reflectometer, applied to the optical time domain reflectometer according to the first aspect, including: (1) obtaining, by the optical time domain reflectometer, a service signal, compensation data, and a PN code sequence; and (2) calculating, by the optical time domain reflectometer, a first optical fiber function according to the service signal, the compensation data, and the PN code sequence, where the compensation data is used to reduce interference from the service signal to the PN code sequence.

According to the second aspect, in a first possible implementation manner a method for obtaining, by the optical time domain reflectometer, the service signal specifically includes: generating, by the optical time domain reflectometer, the service signal; a method for obtaining, by the optical time domain reflectometer, the compensation data specifically includes: generating, by the optical time domain reflectometer, a compensation sequence according to the service signal, where a sum of the compensation sequence and the service signal is a non-zero constant; obtaining, by the optical time domain reflectometer, a second optical fiber function, where the second optical fiber function is an optical fiber function stored in the optical time domain reflectometer; and performing, by the optical time domain reflectometer, an operation on the compensation sequence, the second optical fiber function, and the PN code sequence, to generate the compensation data; and a method for obtaining, by the optical time domain reflectometer, the PN code sequence specifically includes generating, by the optical time domain reflectometer, the PN code sequence.

According to the first possible implementation manner, in a second possible implementation manner, the performing, by the optical time domain reflectometer, an operation on the compensation sequence, the second optical fiber function, and the PN code sequence, to generate the compensation data specifically includes: (1) performing, by the optical time domain reflectometer, a multiplication operation on the compensation sequence and the PN code sequence, and performing a convolution operation on the second optical fiber function and an operation result that is obtained after the optical time domain reflectometer performs the multiplication operation on the compensation sequence and the PN code sequence, to generate the compensation data; or (2) performing, by the optical time domain reflectometer, an addition operation on the compensation sequence and the PN code sequence, and performing a convolution operation on the second optical fiber function and an operation result that is obtained after the optical time domain reflectometer performs the addition operation on the compensation sequence and the PN code sequence, to generate the compensation data.

According to the second aspect, in a third possible implementation manner, the calculating, by the optical time domain reflectometer, a first optical fiber function according to the service signal, the compensation data, and the PN code sequence specifically includes: (1) modulating, by the optical time domain reflectometer, the PN code sequence onto the service signal to obtain a service signal modulated with the PN code sequence, sending the service signal modulated with the PN code sequence to an optical fiber, receiving a signal reflected from the optical fiber, and performing photoelectric detection and analog-to-digital conversion to obtain a sampled signal; (2) performing, by the optical time domain reflectometer, an addition operation on the compensation data and the sampled signal; and (3) performing, by the optical time domain reflectometer, a correlation operation on the PN code sequence and an operation result that is obtained after the optical time domain reflectometer performs the addition operation on the compensation data and the sampled signal, to obtain the first optical fiber function.

According to the second aspect, in a fourth possible implementation manner, after the calculating, by the optical time domain reflectometer, a first optical fiber function according to a sampled signal, the compensation data, the PN code sequence, and a second optical fiber function, the method further includes replacing, by the optical time domain reflectometer, the second optical fiber function with the first optical fiber function.

According to the optical time domain reflectometer and the method for detecting an optical fiber by using the same that are provided in the embodiments of the present invention, the optical time domain reflectometer includes a service signal generator, a signal coupler connected to the service signal generator, an electro-optical modulator connected to the signal coupler, a transmitter connected to the electro-optical modulator, a photoelectric detector connected to the transmitter, and an analog to digital converter connected to the photoelectric detector, and further includes: a digital signal processor, connected to the service signal generator, the signal coupler, and the analog to digital converter, and configured to receive a service signal generated by the service signal generator, generate compensation data and a PN code sequence, send the PN code sequence to the signal coupler, receive a sampled signal sent by the analog to digital converter, and calculate a first optical fiber function according to the compensation data, the PN code sequence, and the sampled signal.

Based on descriptions in the foregoing embodiments, the digital signal processor receives the service signal generated by the service signal generator, generates the compensation data and the PN code sequence, sends the generated PN code sequence to the signal coupler, receives the sampled signal sent by the analog to digital converter, and calculates the first optical fiber function according to the compensation data, the PN code sequence, and the sampled signal. That is, the digital signal processor may perform real-time compensation for the received sampled signal, so that impact of the service signal on PN code sequence correlation is reduced without additional hardware costs or additional data service bandwidths, and a more precise optical fiber function is obtained, thereby improving detection precision of the optical time domain reflectometer.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
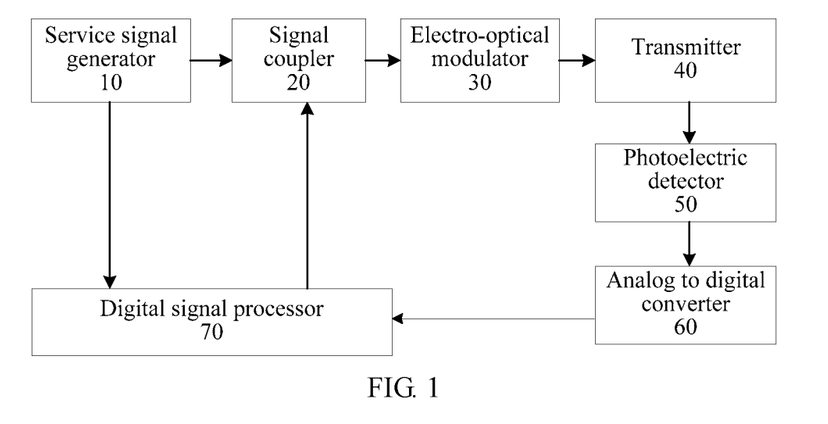
FIG. 1 is a first schematic structural diagram of an optical time domain reflectometer according to an embodiment of the present invention.

This embodiment of the present invention provides an optical time domain reflectometer. As shown in FIG. 1, FIG. 1 is a schematic structural diagram of the optical time domain reflectometer, including a service signal generator 10, a signal coupler 20 connected to the service signal generator 10, an electro-optical modulator 30 connected to the signal coupler 20, a transmitter 40 connected to the electro-optical modulator 30, a photoelectric detector 50 connected to the transmitter 40, and an analog to digital converter 60 connected to the photoelectric detector 50. The optical time domain reflectometer further includes a digital signal processor 70, connected to the service signal generator 10, the signal coupler 20, and the analog to digital converter 60, and configured to: receive a service signal generated by the service signal generator 10, generate compensation data and a PN code sequence, send the PN code sequence to the signal coupler 20, and receive a sampled signal sent by the analog to digital converter 60, so as to calculate a first optical fiber function according to the compensation data, the PN code sequence, and the sampled signal.

The compensation data is used to reduce interference from the service signal to the PN code sequence, and a specific process of calculating the compensation data is described in detail in the following embodiment.

In addition, the PN code sequence is a coding sequence formed by 0 and 1 and having an autocorrelation property similar to that of white noise, and has good autocorrelation.

It should be noted that, the service signal generator 10 is configured to generate the service signal, and send the generated service signal to the signal coupler 20 and the digital signal processor 70.

It should also be noted that, the signal coupler 20 receives the service signal sent by the service signal generator 10 and the PN code sequence sent by the digital signal processor, and couples the service signal and the PN code sequence, so that the PN code sequence can be modulated onto the service signal, and a modulation depth of the PN code sequence is controllable. The modulation depth of the PN code sequence refers to a ratio of an amplitude of the PN code sequence to an amplitude of a modulated signal. Finally, the signal coupler 20 sends the modulated signal to the electro-optical modulator 30.

Specifically, a method for coupling, by the signal coupler 20, the service signal and the PN code sequence may be: multiplying the service signal by the PN code sequence or adding the service signal to the PN code sequence on a circuit, or may be: modulating, by using an external-modulation optical component, the PN code sequence onto an optical carrier having the service signal. This is not limited in the present invention.

It should be noted that, the electro-optical modulator 30 receives the service signal that is modulated with the PN code sequence and that is sent by the signal coupler 20, performs electro-optical conversion on the service signal modulated with the PN code sequence, and then sends a converted service signal to an optical fiber by using the transmitter 40.

In addition, the transmitter 40 may be a circulator or a coupler. The transmitter 40 receives the service signal that is modulated and that is sent by the electro-optical modulator 30, and sends the service signal to an optical fiber; and receives a signal reflected from the optical fiber, and sends the signal to the photoelectric detector 50, so as to facilitate subsequent signal processing by the optical time domain reflectometer. The transmitter 40 in the present invention can implement transmit-receive isolation. Therefore, any device having a transmit-receive isolation function can be used as the transmitter. This is not limited in the present invention.

It should also be noted that, the photoelectric detector 50 performs photoelectric conversion on an optical signal that is received by the transmitter 40 and that is reflected from the optical fiber, performs amplification and filtering, and then sends the signal to the analog to digital converter 60.

Specifically, after the signal is transmitted through the optical fiber, a loss may be caused to signal energy. To improve precision of subsequent digital signal processing, the photoelectric detector 50 further can perform filtering and amplification processing on a weak optical signal that is received.

In addition, the electro-optical modulator 30 converts an electrical signal into an optical signal, so that the signal can be transmitted in an optical fiber. The photoelectric detector 50 converts an optical signal reflected from the optical fiber into an electrical signal, so as to facilitate processing of the electrical signal by various signal processors.

It should also be noted that, the analog to digital converter 60 receives the electrical signal sent by the photoelectric detector 50, performs sampling on the electrical signal, and sends the sampled signal to the digital signal processor 70.

It should also be noted that, the digital signal processor 70 is configured to generate the PN code sequence and the compensation data, and receive the sampled signal sent by the analog to digital converter 60. The digital signal processor 70 performs real-time compensation for the sampled signal according to the compensation data, so as to reduce impact of the service signal on PN code sequence correlation and improve detection precision of the optical time domain reflectometer.

Further, the digital signal processor is specifically configured to: generate the PN code sequence and send the PN code sequence to the signal coupler; receive the sampled signal sent by the analog to digital converter; read a second optical fiber function; receive the service signal generated by the service signal generator, and generate a compensation sequence according to the service signal; perform an operation on the compensation sequence, the second optical fiber function, and the PN code sequence, to generate the compensation data; and calculate the first optical fiber function according to the compensation data, the PN code sequence, and the sampled signal, where the second optical fiber function is an optical fiber function stored in the digital signal processor, and a sum of the compensation sequence and the service signal is a non-zero constant.

Figure 2:
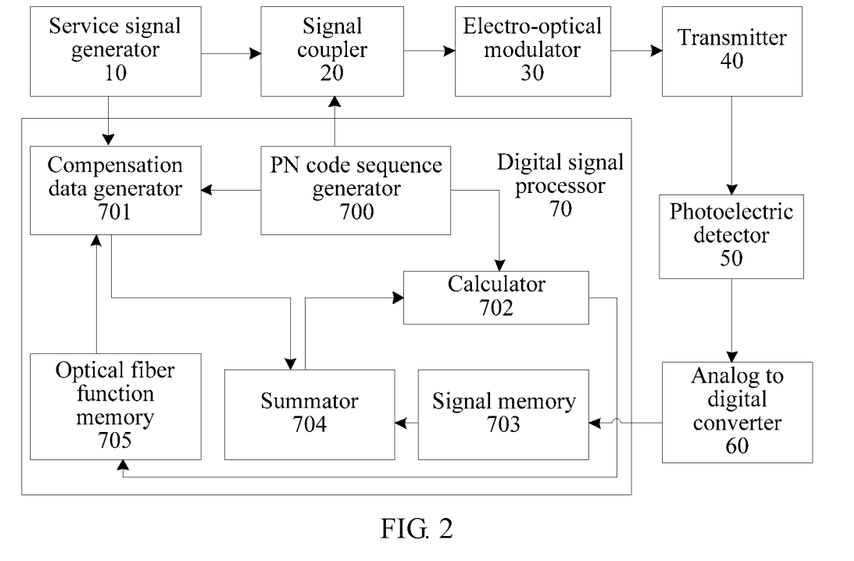
FIG. 2 is a second schematic structural diagram of an optical time domain reflectometer according to an embodiment of the present invention.

The digital signal processor 70, as shown in FIG. 2, specifically includes: a PN code sequence generator 700 connected to the signal coupler 20, a signal memory 703 connected to the analog to digital converter 60, a compensation data generator 701 that is connected to the service signal generator 10 and the PN code sequence generator 700, a summator 704 that is connected to the signal memory 703 and the compensation data generator 701, a calculator 702 that is connected to the summator 704 and the PN code sequence generator 700, and an optical fiber function memory 705 that is connected to the calculator 702 and the compensation data generator 701.

It should be noted that, the PN code sequence generator 700 is configured to generate the PN code sequence, and send the generated PN code sequence to the signal coupler 20. In this way, the signal coupler 20 can modulate the PN code sequence onto the service signal. Meanwhile, the PN code sequence generator 700 sends the PN code sequence to the compensation data generator 701, so that the compensation data generator 701 can generate the compensation data according to the service signal and the PN code sequence. The PN code sequence generator 700 further can send the PN code sequence to the final calculator 702. The calculator 702 eliminates the impact of the service signal on the PN code sequence correlation according to a property of a correlation operation, to obtain the first optical fiber function.

In addition, the first optical fiber function represents an attenuation curve of the optical fiber in a current status. When the calculator 702 calculates the first optical fiber function according to the compensation data, the PN code sequence, and the sampled signal and sends the first optical fiber function to the optical fiber function memory 705, the optical fiber function memory 705 stores the first optical fiber function, and replaces, with the first optical fiber function, the second optical fiber function that is previously stored in the optical fiber function memory 705. When calculation is performed next time, the second optical fiber function that is just stored is used, so that an error of the calculation becomes smaller.

It should be noted that, a process of generating the sampled signal is: After the signal coupler 20 couples the service signal and the PN code sequence, the electro-optical modulator 30 converts the signal, and sends the signal to the optical fiber by using the transmitter 40; and the photoelectric detector 50 receives an optical signal reflected from the optical fiber, converts the optical signal into an electrical signal, and then sends the electrical signal to the analog to digital converter 60; the analog to digital converter 60 performs sampling on the signal, so as to obtain the sampled signal. Therefore, a signal stored in the signal memory 703 is the sampled signal.

It should be noted that, the signal memory 703 is configured to receive and store the sampled signal sent by the analog to digital converter 60. The signal memory 703 receives the sampled signal sent by the analog to digital converter 60, and sends the sampled signal to the summator 704 for an operation.

It should also be noted that, the compensation data generator 701 is configured to generate the compensation data of the sampled signal according to the service signal sent by the service signal generator 10, the PN code sequence sent by the PN code sequence generator 700, and the second optical fiber function sent by the optical fiber function memory 705, and send the generated compensation data to the summator 704 for an operation.

It should also be noted that, the summator 704 is configured to perform an addition operation on the compensation data and the sampled signal, and send an operation result to the calculator 702.

It should also be noted that, the calculator 702 is configured to receive the PN code sequence sent by the PN code sequence generator 700 and the operation result that is obtained and sent by the summator 704 after the summator 704 performs the addition operation on the compensation data and the sampled signal, calculate the first optical fiber function according to the operation result of the compensation data and the sampled signal, and the PN code sequence, and send the generated first optical fiber function to the optical fiber function memory 705 as an optical fiber function of a next operation.

It should also be noted that, the optical fiber function memory 705 is configured to store the first optical fiber function sent by the calculator 702, and send the second optical fiber function to the compensation data generator 701.

In addition, the second optical fiber function pre-stored in the optical fiber function memory 705 may be a relatively ideal optical fiber function for an off-line test, or may be an optical fiber function for a previous online measurement. This is not limited in the present invention.

Figure 3:
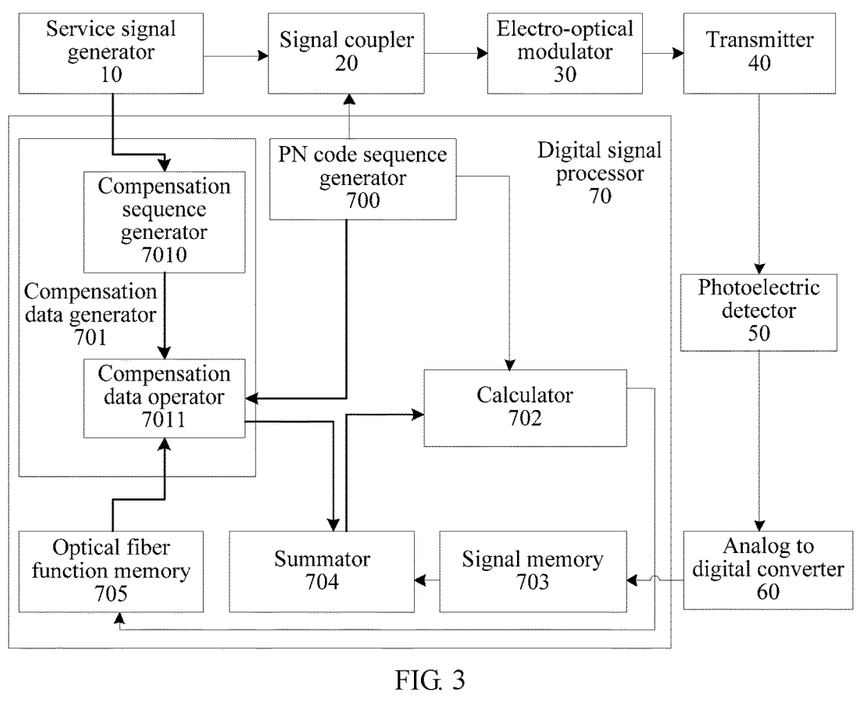
FIG. 3 is a third schematic structural diagram of an optical time domain reflectometer according to an embodiment of the present invention.

As shown in FIG. 3, the compensation data generator 701 specifically includes: a compensation sequence generator 7010, connected to the service signal generator 10, and configured to receive the service signal sent by the service signal generator 10, generate the compensation sequence according to the service signal, and send the compensation sequence to a compensation data operator 7011, where the sum of the compensation sequence and the service signal is a non-zero constant; the compensation data operator 7011, connected to the compensation sequence generator 7010 and the PN code sequence generator 700, and configured to receive the compensation sequence sent by the compensation sequence generator 7010, the PN code sequence sent by the PN code sequence generator 700, and the second optical fiber function sent by the optical fiber function memory 705, perform an operation on the compensation sequence, the second optical fiber function, and the PN code sequence, to generate the compensation data, and send the compensation data to the summator 704.

In addition, the compensation sequence generator 7010 generates a compensation sequence for a received service signal. If the service signal is D, in a scenario in which a rate of the service signal D is relatively high and a data volume is relatively large, N data bits in the service signal D is used as a processing unit, and integration is performed on the N bits to generate a new value. Assuming that a quantity of data bits in one period of the PN code sequence is K, K/N new values may be generated for the service signal D, and a compensation sequence is generated according to the K/N values. In this way, a data processing amount can be reduced by N times, so as to improve the operation efficiency.

Figure 4:
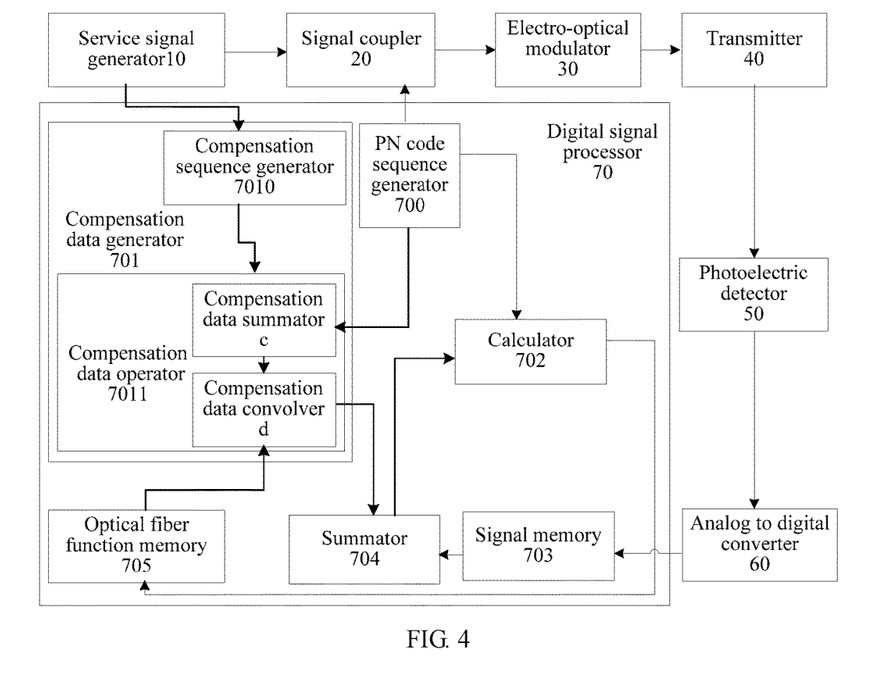
FIG. 4 is a fourth schematic structural diagram of an optical time domain reflectometer according to an embodiment of the present invention.

Optionally, as shown in FIG. 4, the compensation data operator 7011 may further specifically include: a compensation data summator c, connected to the compensation sequence generator 7010 and the PN code sequence generator 700, and configured to receive the compensation sequence sent by the compensation sequence generator 7010 and the PN code sequence sent by the PN code sequence generator 700, perform an addition operation on the compensation sequence and the PN code sequence, and send an operation result to a compensation data convolver d; the compensation data convolver d, connected to the compensation data summator c, the optical fiber function memory 705, and the summator 704, and configured to receive the second optical fiber function sent by the optical fiber function memory 705 and the operation result that is sent by the compensation data summator c after the compensation data summator c performs the addition operation on the compensation sequence and the PN code sequence, and perform a convolution operation on the second optical fiber function and the operation result that is obtained after the compensation data summator c performs the addition operation on the compensation sequence and the PN code sequence, to obtain the compensation data, and send the compensation data to the summator 704.

Figure 5:
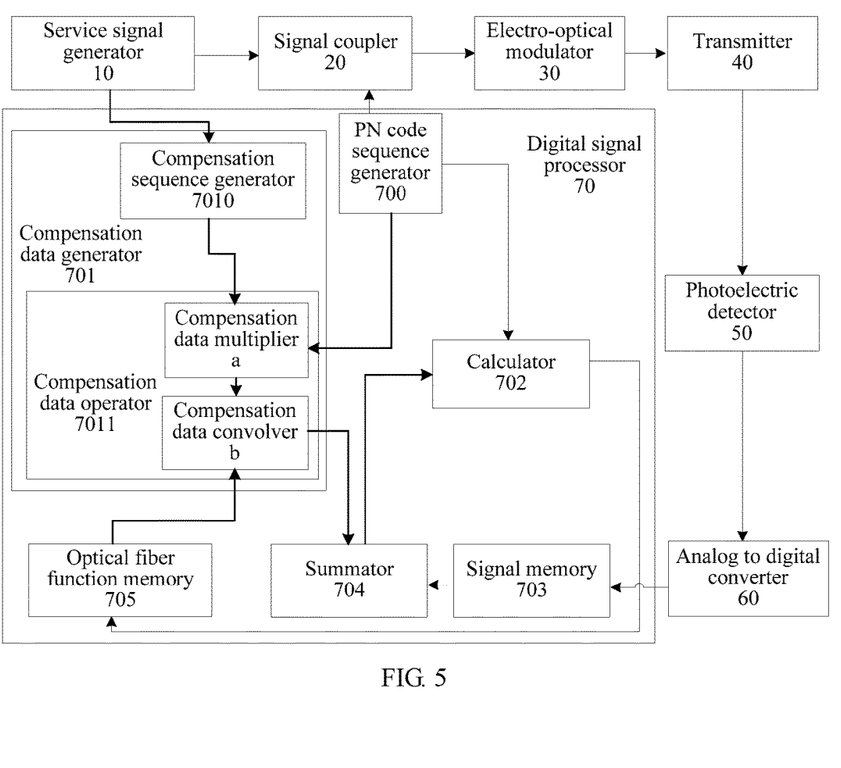
FIG. 5 is a fifth schematic structural diagram of an optical time domain reflectometer according to an embodiment of the present invention.

Preferably, as shown in FIG. 5, the compensation data operator 7011 specifically includes: a compensation data multiplier a, connected to the compensation sequence generator 7010 and the PN code sequence generator 700, and configured to receive the compensation sequence sent by the compensation sequence generator 7010 and the PN code sequence sent by the PN code sequence generator 700, perform a multiplication operation on the compensation sequence and the PN code sequence, and send an operation result to a compensation data convolver b; the compensation data convolver b, connected to the compensation data multiplier a, the optical fiber function memory 705, and the summator 704, and configured to receive the second optical fiber function sent by the optical fiber function memory 705 and the operation result that is sent by the compensation data multiplier a after the compensation data multiplier a performs the multiplication operation on the compensation sequence and the PN code sequence, and perform a convolution operation on the second optical fiber function and the operation result that is obtained after the compensation data multiplier a performs the multiplication operation on the compensation sequence and the PN code sequence, to obtain the compensation data, and send the compensation data to the summator 704.

Specifically, a working principle of the optical time domain reflectometer provided in this embodiment of the present invention is described by using a working process and a signal flow of the optical time domain reflectometer in an actual application as an example.

Assuming that A is a correlation gain, B is the second optical fiber function, C is the PN code sequence, and D is the service signal, ~D is a compensation sequence of D, ⊗ is a convolution operator, and e is a correlation operator, where ~ represents a negation operator in mathematics, ~D is used to represent any compensation sequence of D.

It should be noted that the correlation gain A is an inherent gain that is generated when a system performs a correlation operation.

It should be noted that, a sum of the service signal D and the compensation sequence ~D of the service signal is a non-zero constant E, where E may be all 1 or another appropriate constant. For example, E=1, the compensation sequence ~D is obtained after an negation operation is performed on 0 and 1 of the service signal.

Further, the compensation sequence ~D is generated by the compensation sequence generator 7010. Specifically, when the compensation sequence generator 7010 generates the compensation sequence ~D of the service signal D, the compensation sequence generator 7010 may obtain the compensation sequence ~D directly based on the service signal in an electrical domain, or obtain the compensation sequence ~D in an optical domain by means of additional photoelectric detection. A manner of generating the compensation sequence ~D of the service signal D is not limited in the present invention.

In addition, in a linear system, an output signal that is obtained after an input signal is emitted from the optical fiber is a result of a convolution operation that is performed on the input signal and an actual optical fiber function of the optical fiber. Herein, it is assumed that the actual optical fiber function of the optical fiber is the second optical fiber function.

When the compensation data operator 7011 in the optical time domain reflectometer includes the compensation data multiplier a and the compensation data convolver b, the following formula may be obtained according to a principle of the linear system:

$$Ce((D \times C) \otimes B) + Ce((\sim D \times C) \otimes B) = Ce((D + \sim D) \times C) \otimes B$$
$$= Ce(E \times C) \otimes B$$
$$= E \times A \times B$$

In the foregoing formula, the compensation data generator 701 in the optical time domain reflectometer performs compensation for a sampled signal reflected from the optical fiber, to eliminate impact of the service signal on the PN code sequence correlation. In a result of the foregoing formula, E and A are fixed values, so that a more precise first optical fiber function B can be obtained by means of an operation.

When the compensation data operator 7011 includes the compensation data summator c and the compensation data convolver d, the following formula may be obtained according to a principle of the linear system:

$$Ce((D + C) \otimes B) + Ce((\sim D + C) \otimes B) = Ce(D + \sim D + 2C) \otimes B$$
$$= Ce(E + 2C) \otimes B$$
$$= CeE \otimes B + Ce2C \otimes B$$
$$\approx 2A \times B$$

In addition, because a result of C e E ⊗ B is far less than a result of C e 2C ⊗ B, the result of C e E ⊗ B is negligible, and a final result of the foregoing formula is approximately equal to 2A×B.

In the foregoing formula, the compensation data generator 701 in the optical time domain reflectometer performs compensation for the sampled signal reflected from the optical fiber, to eliminate impact of the service signal on the PN code sequence correlation. In a result of the foregoing formula, 2A is a fixed value, so that a more precise optical fiber function B can be obtained by means of an operation.

Preferably, compared with a case in which the compensation data operator 7011 in the optical time domain reflectometer includes the compensation data summator c and the compensation data convolver d, when the compensation data operator 7011 in the optical time domain reflectometer includes the compensation data multiplier a and the compensation data convolver b, calculation is relatively simple and convenient. If a process permits, generally, the compensation data multiplier a and the compensation data convolver b are selected.

The optical time domain reflectometer provided in this embodiment of the present invention includes a service signal generator, a signal coupler connected to the service signal generator, an electro-optical modulator connected to the signal coupler, a transmitter connected to the electro-optical modulator, a photoelectric detector connected to the transmitter, and an analog to digital converter connected to the photoelectric detector. The optical time domain reflectometer further includes: a digital signal processor, connected to the service signal generator, the signal coupler, and the analog to digital converter, and configured to generate compensation data and a PN code sequence, receive a sampled signal sent by the analog to digital converter, and calculate a first optical fiber function according to the compensation data, the PN code sequence, and the sampled signal.

Based on descriptions in the foregoing embodiment, the digital signal processor receives a service signal generated by the service signal generator, generates the compensation data and the PN code sequence, sends the generated PN code sequence to the signal coupler, receives the sampled signal sent by the analog to digital converter, and calculates the first optical fiber function according to the compensation data, the PN code sequence, and the sampled signal. That is, the digital signal processor may perform real-time compensation for the received sampled signal, so that impact of the service signal on PN code sequence correlation is reduced without additional hardware costs or additional data service bandwidths, and a more precise optical fiber function is obtained, thereby improving detection precision of the optical time domain reflectometer.

Embodiment 2

Figure 6:
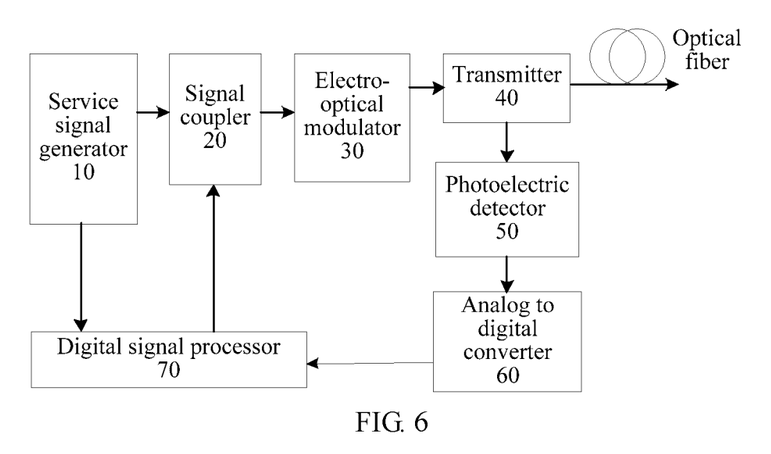
FIG. 6 shows an error compensation apparatus according to an embodiment of the present invention.

This embodiment of the present invention further provides an error compensation apparatus. As shown in FIG. 6, FIG. 6 is a schematic structural diagram of the error compensation apparatus. The error compensation apparatus includes the optical time domain reflectometer shown in the foregoing embodiment and an optical fiber connected to the optical time domain reflectometer.

Based on descriptions in the foregoing embodiment, the error compensation apparatus receives a service signal generated by a service signal generator, generates compensation data and a PN code sequence, sends the generated PN code sequence to a signal coupler, receives a sampled signal sent by an analog to digital converter, and calculates a first optical fiber function according to the compensation data, the PN code sequence, and the sampled signal. That is, a digital signal processor may perform real-time compensation for the received sampled signal, so that impact caused by randomness of the service signal on PN code sequence correlation is reduced without additional hardware costs or additional data service bandwidths, and a more precise optical fiber function is obtained, thereby improving detection precision of an optical time domain reflectometer.

Embodiment 3

Figure 7:
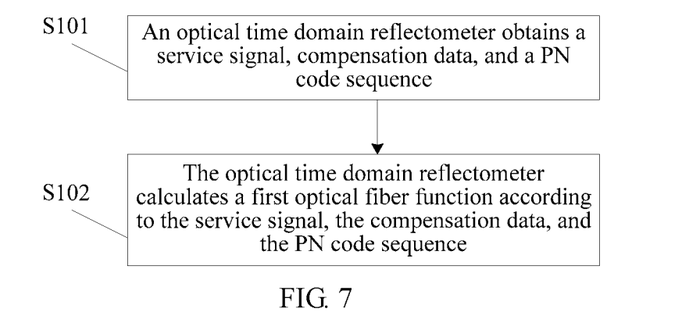
FIG. 7 is a first schematic flowchart of a method for detecting an optical fiber by using an optical time domain reflectometer according to an embodiment of the present invention.

This embodiment of the present invention provides a method for detecting an optical fiber by using an optical time domain reflectometer. This embodiment is described by using an example in which the method for detecting an optical fiber is applied to the optical time domain reflectometer in Embodiment 2. A schematic flowchart of the method for detecting an optical fiber by using an optical time domain reflectometer is shown in FIG. 7, and includes the following steps.

S101: The optical time domain reflectometer obtains a service signal, compensation data, and a PN code sequence.

It should be noted that, the optical time domain reflectometer generates the service signal and the PN code sequence, so as to generate a compensation sequence according to the service signal, generates the compensation data according to the compensation sequence, the PN code sequence, and a second optical fiber function that is stored in an optical fiber function memory in the optical time domain reflectometer, and performs real-time compensation for a sampled signal reflected from the optical fiber. A specific process of obtaining, by the optical time domain reflectometer, the service signal, the compensation data, and the PN code sequence is described in detail in the following embodiment.

S102: The optical time domain reflectometer calculates a first optical fiber function according to the service signal, the compensation data, and the PN code sequence.

It should be noted that, a process of calculating, by the optical time domain reflectometer, the first optical fiber function according to the service signal, the compensation data, and the PN code sequence is: The optical time domain reflectometer modulates the PN code sequence onto the service signal to obtain a service signal modulated with the PN code sequence, then sends the service signal modulated with the PN code sequence to the optical fiber, receives a signal reflected from the optical fiber, performs photoelectric detection and analog-to-digital conversion, and obtains the sampled signal; the optical time domain reflectometer performs an addition operation on the compensation data and the sampled signal; and the optical time domain reflectometer performs a correlation operation on the PN code sequence and an operation result that is obtained after the optical time domain reflectometer performs the addition operation on the compensation data and the sampled signal, to obtain the first optical fiber function. Therefore, the second optical fiber function may be replaced with the first optical fiber function, so as to reduce an error of next calculation. A specific process of calculating, by the optical time domain reflectometer, the first optical fiber function according to the service signal, the compensation data, and the PN code sequence is described in detail in the following embodiment.

The method, provided in this embodiment of the present invention, for detecting an optical fiber by using an optical time domain reflectometer includes: obtaining, by an optical time domain reflectometer, a service signal, compensation data, and a PN code sequence; and calculating, by the optical time domain reflectometer, a first optical fiber function according to the service signal, the compensation data, and the PN code sequence.

Based on descriptions in the foregoing embodiment, an optical time domain reflectometer obtains a service signal, compensation data, and a PN code sequence, and performs real-time compensation for a received sampled signal according to the compensation data, so that impact of the service signal on PN code sequence correlation is reduced without additional hardware costs or additional data service bandwidths, and a more precise optical fiber function is obtained, thereby improving detection precision of the optical time domain reflectometer.

Embodiment 4

Figure 8:
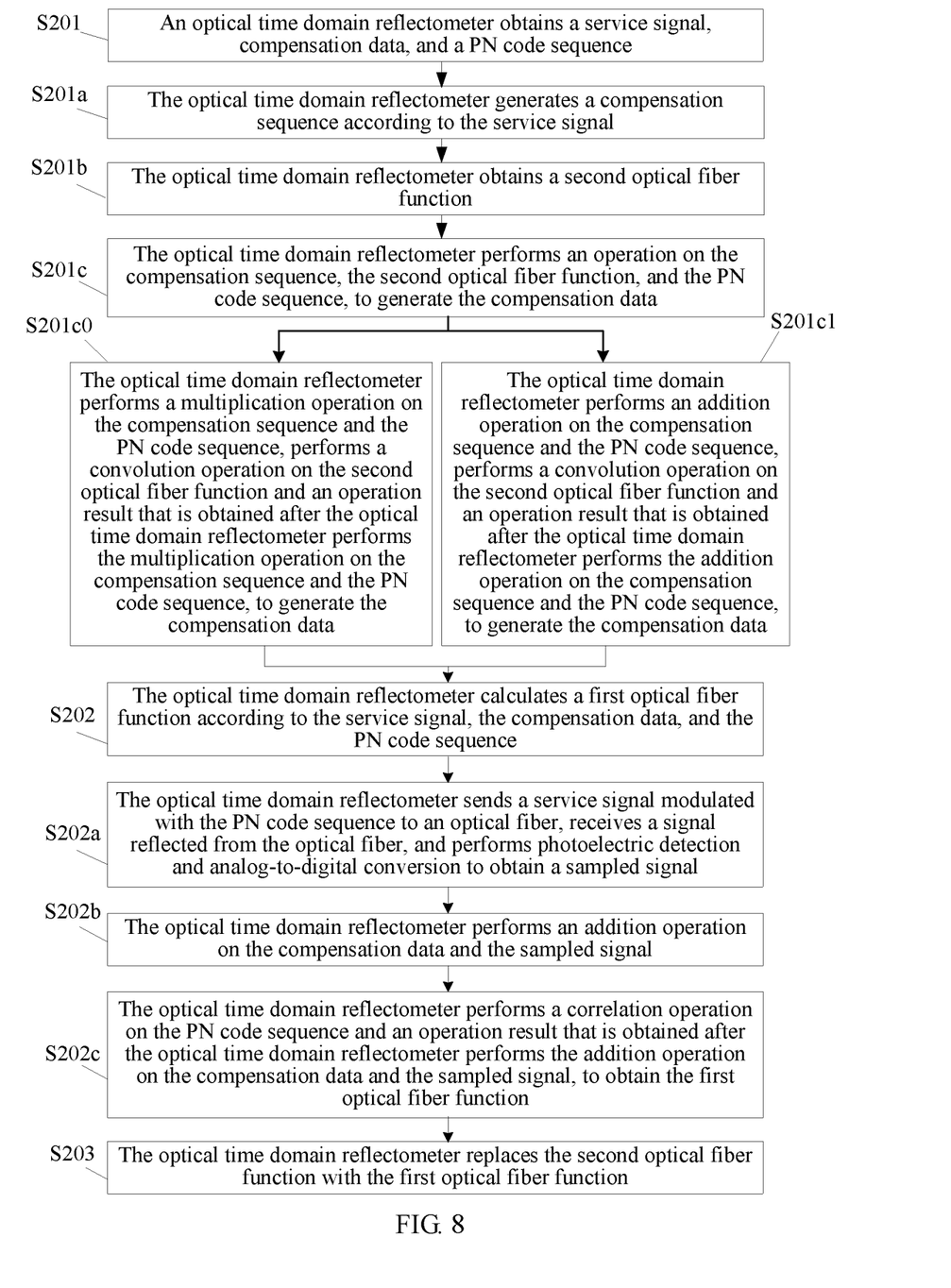
FIG. 8 is a second schematic flowchart of a method for detecting an optical fiber by using an optical time domain reflectometer according to an embodiment of the present invention.

This embodiment of the present invention provides a method for detecting an optical fiber by using an optical time domain reflectometer. This embodiment is described by using an example in which the method for detecting an optical fiber is applied to the optical time domain reflectometer in Embodiment 2. A schematic flowchart of the method for detecting an optical fiber by using an optical time domain reflectometer is shown in FIG. 8, and includes the following steps.

S201: The optical time domain reflectometer obtains a service signal, compensation data, and a PN code sequence.

Specifically, a method for obtaining, by the optical time domain reflectometer, the service signal is: generating, by a service signal generator in the optical time domain reflectometer, the service signal.

Specifically, a method for obtaining, by the optical time domain reflectometer, the PN code sequence is: generating, by a PN code sequence generator in the optical time domain reflectometer, the PN code sequence.

It should be noted that, there is no sequence for generating, by the optical time domain reflectometer, the service signal and the PN code sequence, and the sequence may be set according to hardware conditions of an actual device. This is not limited in the present invention.

Further specifically, a method for obtaining, by the optical time domain reflectometer, the compensation data specifically includes the following steps.

S201$a$: The optical time domain reflectometer generates a compensation sequence according to the service signal.

A sum of the compensation sequence and the service signal is a non-zero constant, and the generated compensation sequence is stored in a compensation sequence generator in the optical time domain reflectometer.

S201$b$: The optical time domain reflectometer obtains a second optical fiber function.

The second optical fiber function is an optical fiber function stored in an optical fiber function memory in the optical time domain reflectometer, and the second optical fiber function is used for generating the compensation data together with the compensation sequence and the PN code sequence.

S201$c$: The optical time domain reflectometer performs an operation on the compensation sequence, the second optical fiber function, and the PN code sequence, to generate the compensation data.

Specifically, the performing, by the optical time domain reflectometer, an operation on the compensation sequence, the second optical fiber function, and the PN code sequence, to generate the compensation data specifically includes S201$c$0 and S201$c$1.

S201$c$0: The optical time domain reflectometer performs a multiplication operation on the compensation sequence and the PN code sequence, and performs a convolution operation on the second optical fiber function and an operation result that is obtained after the optical time domain reflectometer performs the multiplication operation on the compensation sequence and the PN code sequence, to generate the compensation data.

It should be noted that, the multiplication operation on the compensation sequence and the PN code sequence is implemented by a compensation data multiplier in the optical time domain reflectometer. Then, the convolution operation is performed on the operation result of the compensation data multiplier and the second optical fiber function, to obtain the compensation data. Specifically, the convolution operation is implemented by a convolver in the optical time domain reflectometer.

S201$c$1: The optical time domain reflectometer performs an addition operation on the compensation sequence and the PN code sequence, and performs a convolution operation on the second optical fiber function and an operation result that is obtained after the optical time domain reflectometer performs the addition operation on the compensation sequence and the PN code sequence, to generate the compensation data.

It should be noted that, the addition operation on the compensation sequence and the PN code sequence is implemented by a compensation data summator in the optical time domain reflectometer. Then, the convolution operation is performed on the operation result of the compensation data summator and the second optical fiber function, to obtain the compensation data. Specifically, the convolution operation is implemented by the convolver in the optical time domain reflectometer.

It should be noted that, one step is selected from S201$c$0 and S201$c$1 and is performed. The compensation data may be generated by using either of the two manners, and a preferred manner is the manner in S201$c$0.

S202: The optical time domain reflectometer calculates a first optical fiber function according to the service signal, the compensation data, and the PN code sequence.

Specifically, the step of calculating, by the optical time domain reflectometer, a first optical fiber function according to the service signal, the compensation data, and the PN code sequence specifically includes S202$a$ to S202$c$.

S202$a$: The optical time domain reflectometer modulates the PN code sequence onto the service signal to obtain a service signal modulated with the PN code sequence, sends the service signal modulated with the PN code sequence to an optical fiber, receives a signal reflected from the optical fiber, and performs photoelectric detection and analog-to-digital conversion to obtain a sampled signal.

It should be noted that, the sampled signal obtained by the optical time domain reflectometer refers to a signal obtained by means of the following process: A signal coupler in the optical time domain reflectometer couples the service signal and the PN code sequence; an electro-optical modulator in the optical time domain reflectometer converts the signal, and transmits the signal to the optical fiber by using a transmitter in the optical time domain reflectometer; a photoelectric detector receives an optical signal reflected from the optical fiber, converts the optical signal into an electrical signal, and sends the electrical signal to an analog to digital converter in the optical time domain reflectometer; and the analog to digital converter in the optical time domain reflectometer performs sampling on the signal, so as to obtain the sampled signal.

Specifically, a process of modulating the PN code sequence onto the service signal is implemented by the signal coupler in the optical time domain reflectometer, the signal coupler may control a modulation depth of the PN code sequence, and the modulation depth of the PN code sequence is consistent with a definition in Embodiment 1, and details are not described herein again.

S202$b$: The optical time domain reflectometer performs an addition operation on the compensation data and the sampled signal.

Specifically, the addition operation on the compensation data and the sampled signal is implemented by a summator in the optical time domain reflectometer.

S202$c$: The optical time domain reflectometer performs a correlation operation on the PN code sequence and an operation result that is obtained after the optical time domain reflectometer performs the addition operation on the compensation data and the sampled signal, to obtain the first optical fiber function.

Specifically, a process of performing the correlation operation on the PN code sequence and the operation result that is obtained after the optical time domain reflectometer performs the addition operation on the compensation data and the sampled signal is implemented by a calculator in the optical time domain reflectometer, and the calculator is specifically configured to implement the correlation operation.

By means of the correlation operation, impact of the service signal on the PN code sequence correlation may be reduced, so as to obtain a more precise first optical fiber function. In addition, an optical fiber function that is obtained by the calculator in the optical time domain reflectometer by means of the correlation operation is referred to as the first optical fiber function.

S203: The optical time domain reflectometer replaces the second optical fiber function with the first optical fiber function.

Specifically, the first optical fiber function that is obtained by the optical time domain reflectometer by means of the foregoing method for detecting an optical fiber represents an attenuation curve of the optical fiber in a current status. The first optical fiber function is used to replace the second optical fiber function stored in an optical fiber function memory in the optical time domain reflectometer. During next real-time calculation, a latest optical fiber function is used for calculation of the compensation data. In this way, an error of an optical fiber function that is obtained by using the method for detecting an optical fiber becomes smaller.

The method, provided in this embodiment of the present invention, for detecting an optical fiber by using an optical time domain reflectometer includes: obtaining, by an optical time domain reflectometer, a service signal, compensation data, and a PN code sequence; and calculating, by the optical time domain reflectometer, a first optical fiber function according to the service signal, the compensation data, and the PN code sequence.

Based on descriptions in the foregoing embodiment, an optical time domain reflectometer obtains a service signal, compensation data, and a PN code sequence, and performs real-time compensation for a sampled signal by using the compensation data. By means of the method for detecting an optical fiber by using the optical time domain reflectometer, impact of the service signal on PN code sequence correlation can be reduced without additional hardware costs or additional data service bandwidths, so as to obtain a more precise first optical fiber function and improve detection precision of the optical time domain reflectometer.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical time domain reflectometer comprising:
   a service signal generator;
   a signal coupler connected to the service signal generator;
   an electro-optical modulator connected to the signal coupler;
   a transmitter connected to the electro-optical modulator;
   a photoelectric detector connected to the transmitter;
   an analog to digital converter connected to the photoelectric detector; and
   a digital signal processor connected to the service signal generator, the signal coupler, and the analog to digital converter, the digital signal processor configured to:
   receive a service signal generated by the service signal generator;
   generate compensation data and a PN code sequence;
   send the PN code sequence to the signal coupler;
   receive a sampled signal sent by the analog to digital converter; and
   calculate a first optical fiber function according to the compensation data, the PN code sequence, and the sampled signal,
   wherein the compensation data is used to reduce interference from the service signal to the PN code sequence, wherein the sampled signal is a signal that is sent by the analog to digital converter after the analog to digital converter performs sampling on a service signal that is modulated with the PN code sequence and that is reflected from a first optical fiber.

2. The optical time domain reflectometer according to claim 1, wherein the digital signal processor is further configured to:
   generate the PN code sequence;
   send the PN code sequence to the signal coupler;
   receive the sampled signal sent by the analog to digital converter;
   read a second optical fiber function;
   receive the service signal generated by the service signal generator;
   generate a compensation sequence according to the service signal;
   perform an operation on the compensation sequence, the second optical fiber function, and the PN code sequence, to generate the compensation data; and
   calculate the first optical fiber function according to the compensation data, the PN code sequence, and the sampled signal,
   wherein the second optical fiber function is an optical fiber function stored in the digital signal processor, and a sum of the compensation sequence and the service signal is a non-zero constant.

3. The optical time domain reflectometer according to claim 1, wherein the digital signal processor comprises:
   a PN code sequence generator connected to the signal coupler, the PN code sequence generator configured to generate the PN code sequence and to send the PN code sequence to the signal coupler, a compensation data generator and a calculator;
   a signal memory connected to the analog to digital converter, the signal memory configured to receive and store the sampled signal sent by the analog to digital converter, and send the sampled signal to a summator;
   the compensation data generator connected to the service signal generator and the PN code sequence generator, the compensation data generator configured to:
   receive the service signal sent by the service signal generator, the PN code sequence sent by the PN code sequence generator and a second optical fiber function sent by an optical fiber function memory, wherein the second optical fiber function is an optical fiber function stored in the optical fiber function memory;
   generate the compensation data according to the service signal, the PN code sequence, and the second optical fiber function; and
   send the compensation data to the summator;
   the summator connected to the signal memory and the compensation data generator, the summator configured to perform an addition operation on the compensation data and the sampled signal, and send an operation result to the calculator;
   the calculator connected to the summator and the PN code sequence generator, the calculator configured to:
   receive the PN code sequence sent by the PN code sequence generator and the operation result that is obtained and sent by the summator after the summator performs the addition operation on the compensation data and the sampled signal, calculate the first optical fiber function according to the PN code sequence and the operation result that is obtained after the summator performs the addition operation on the compensation data and the sampled signal, and send the first optical fiber function to the optical fiber function memory, so that the optical fiber function memory replaces the second optical fiber function with the first optical fiber function; and the optical fiber function memory connected to the calculator and the compensation data generator, optical fiber function memory configured to store the second optical fiber function and the first optical fiber function that is sent by the calculator, and send the second optical fiber function to the compensation data generator.

4. The optical time domain reflectometer according to claim 3, wherein the compensation data generator comprises:

a compensation sequence generator connected to the service signal generator, the compensation sequence generator configured to receive the service signal sent by the service signal generator, generate the compensation sequence according to the service signal, and send the compensation sequence to a compensation data operator; and the compensation data operator connected to the compensation sequence generator and the PN code sequence generator, the compensation data operator configured to:

receive the compensation sequence sent by the compensation sequence generator, the PN code sequence sent by the PN code sequence generator, and the second optical fiber function sent by the optical fiber function memory;

perform an operation on the compensation sequence, the PN code sequence, and the second optical fiber function, to generate the compensation data; and send the compensation data to the summator.

5. The optical time domain reflectometer according to claim 3, wherein the compensation data operator comprises:

a compensation data multiplier connected to the compensation sequence generator and the PN code sequence generator, the compensation data multiplier configured to:

receive the compensation sequence sent by the compensation sequence generator and the PN code sequence sent by the PN code sequence generator;

perform a multiplication operation on the compensation sequence and the PN code sequence; and send an operation result to a compensation data convolver; and the compensation data convolver connected to the compensation data multiplier, the summator, and the optical fiber function memory, the compensation data convolver configured to:

receive the second optical fiber function sent by the optical fiber function memory and the operation result that is obtained and sent by the compensation data multiplier after the compensation data multiplier performs the multiplication operation on the compensation sequence and the PN code sequence;

perform a convolution operation on the second optical fiber function and the operation result that is obtained after the compensation data multiplier performs the multiplication operation on the compensation sequence and the PN code sequence, to obtain the compensation data; and send the compensation data to the summator.

6. The optical time domain reflectometer according to claim 3, wherein the compensation data operator comprises:

a compensation data summator connected to the compensation sequence generator and the PN code sequence generator, the compensation data summator configured to:

receive the compensation sequence sent by the compensation sequence generator and the PN code sequence sent by the PN code sequence generator;

perform an addition operation on the compensation sequence and the PN code sequence; and send an operation result to a compensation data convolver; and the compensation data convolver connected to the compensation data summator, the summator, and the optical fiber function memory, the compensation data convolver configured to:

receive the second optical fiber function sent by the optical fiber function memory and the operation result that is obtained and sent by the compensation data summator after the compensation data summator performs the addition operation on the compensation sequence and the PN code sequence;

perform a convolution operation on the second optical fiber function and the operation result that is obtained after the compensation data summator performs the addition operation on the compensation sequence and the PN code sequence, to obtain the compensation data; and send the compensation data to the summator.

7. The optical time domain reflectometer according to claim 1, wherein the transmitter is a circulator or a coupler.

8. A method for detecting an optical fiber by using an optical time domain reflectometer, the method comprising:

obtaining, by the optical time domain reflectometer, a service signal, compensation data, and a PN code sequence; and calculating, by the optical time domain reflectometer, a first optical fiber function according to the service signal, the compensation data, and the PN code sequence, wherein the compensation data is used to reduce interference from the service signal to the PN code sequence.

9. The method according to claim 8, wherein obtaining the service signal comprises:

generating, by the optical time domain reflectometer, the service signal;

generating, by the optical time domain reflectometer, a compensation sequence according to the service signal, wherein a sum of the compensation sequence and the service signal is a non-zero constant;

obtaining, by the optical time domain reflectometer, a second optical fiber function, wherein the second optical fiber function is an optical fiber function stored in the optical time domain reflectometer;

performing, by the optical time domain reflectometer, an operation on the compensation sequence, the second optical fiber function, and the PN code sequence, to generate the compensation data; and generating, by the optical time domain reflectometer, the PN code sequence.

10. The method according to claim 9, wherein performing the operation on the compensation sequence, the second optical fiber function, and the PN code sequence, to generate the compensation data comprises:
  performing, by the optical time domain reflectometer, an addition operation on the compensation sequence and the PN code sequence, performing a convolution operation on the second optical fiber function and an operation result that is obtained after the optical time domain reflectometer performs the addition operation on the compensation sequence and the PN code sequence, to generate the compensation data.

11. The method according to claim 10, wherein calculating the first optical fiber function according to the service signal, the compensation data, and the PN code sequence comprises:
  modulating, by the optical time domain reflectometer, the PN code sequence onto the service signal to obtain a service signal modulated with the PN code sequence, sending the service signal modulated with the PN code sequence to an optical fiber, receiving a signal reflected from the optical fiber, and performing photoelectric detection and analog-to-digital conversion to obtain a sampled signal;
  performing, by the optical time domain reflectometer, an addition operation on the compensation data and the sampled signal; and
  performing, by the optical time domain reflectometer, a correlation operation on the PN code sequence and an operation result that is obtained after the optical time domain reflectometer performs the addition operation on the compensation data and the sampled signal, to obtain the first optical fiber function.

12. The method according to claim 8, further comprising, after the calculating the first optical fiber function according to the service signal, the compensation data, the PN code sequence, and a second optical fiber function, replacing, by the optical time domain reflectometer, the second optical fiber function with the first optical fiber function.

13. The method according to claim 8, wherein the PN code sequence and the compensation data are generated by a digital signal processor, and wherein the compensation date is used by the digital signal processor to reduce interference from the service signal to the PN code sequence.

* * * * *